(12) United States Patent
Roberts et al.

(10) Patent No.: US 6,313,932 B1
(45) Date of Patent: Nov. 6, 2001

(54) MULTIPLEXED TRANSMISSION OF OPTICAL SIGNALS

(75) Inventors: Kim Byron Roberts, Herts (GB); Maurice M O'Sullivan, Ottawa (CA); Alan Robinson, Essex (GB); Richard Edward Epworth, Herts (GB)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/048,402

(22) Filed: Mar. 25, 1998

(30) Foreign Application Priority Data

Feb. 11, 1998 (GB) .................................................. 9802913

(51) Int. Cl.[7] .............................. H04J 14/02; H04J 14/08; H04B 10/12; H03M 13/00; G06F 11/00

(52) U.S. Cl. .......................... 359/124; 359/123; 359/127; 359/135; 359/173; 714/752; 714/800

(58) Field of Search ..................................... 359/123, 124, 359/127, 135; 714/752, 800

(56) References Cited

U.S. PATENT DOCUMENTS

| | | | |
|---|---|---|---|
| 3,873,825 | 3/1975 | Jones et al. | 250/199 |
| 4,701,909 | * 10/1987 | Kavehrad et al. | 370/85 |
| 4,866,698 | 9/1989 | Huggins | 370/1 |
| 4,959,826 | 9/1990 | Smith | 370/1 |
| 5,018,142 | * 5/1991 | Simcoe et al. | 370/112 |
| 5,526,155 | * 6/1996 | Knox et al. | 359/130 |
| 5,548,531 | * 8/1996 | Shabeer | 364/514 |
| 5,550,666 | 8/1996 | Zirngibl | 359/125 |
| 5,608,826 | 3/1997 | Boord | 385/37 |

FOREIGN PATENT DOCUMENTS

| | | |
|---|---|---|
| 0654917 A2 | 5/1995 | (EP) . |
| 0771091 A2 | 2/1997 | (EP) . |
| 2224611A | 9/1990 | (GB) . |
| 2275393 A | 8/1994 | (GB) . |

OTHER PUBLICATIONS

De Souza et al., Wavelength–division Multiplexing with Femtosecond Pulses Optics Letters/ vol. 20, No.10/ May 15, 1995.

Shao et al, WDM Coding for High–Capacity Lightwave Systems Journal of Lightwave Technology, vol. 12, No. 1, Jan. 1994.

C. Dragone, An N X N Optical Multiplexer Using a Planar Arrangement of Two Star Couplers, IEEE Photonics Technology Letters, vol. 3, No.9, Sep. 1991.

(List continued on next page.)

Primary Examiner—Leslie Pascal
Assistant Examiner—M. R. Sedighian

(57) ABSTRACT

Optical signals in an optical communication system are transmitted as a train of optical pulses which are multiplexed to provide a large number of channels. Error correction coding is applied to data carried by the channels using both interchannel coding and serial coding of individual channels. When multiplexed by wavelength division multiplexing, a waveguide array is used as a dispersive device having a characteristic of frequency selectivity which is locked by a monitoring and control system to a set of spectral lines from the single pulsed laser which generates the pulses. In the receiver, clock signals are generated by extracting clock signals from the earliest and latest received channel signals and performing interpolation to obtain clock signals for the remaining channels. When multiplexed using a spectral modulation technique, individual channels are represented by distinct sinusoidal modulations in frequency space which are then detected in the receiver by Mach-Zehnder filters.

12 Claims, 13 Drawing Sheets

OTHER PUBLICATIONS

L. Boivin et al, 206–channel Chirped–pulse Wavelength–division Multiplexed Transmitter, IEEE 1997, Electronics Letters, May 8, 1997 vol. 33 No.10.

Fumihiko Ito, Demultiplexed Detection of Ultrafast Optical Signal Using Interferometric Cross–Correlation Technique, Journal of Lightwave Technology, vol. 15, No.6 Jun. 1997.

Ming–Seng Kao, et al, WDM Coding System with Single Parity–Check Channel Journal of Lightwave Technology, vol. 12 No.10 Oct. 1994.

M.C. Nuss et al, Scalable 32 Channel Chirped–pulse WDM Source, Electronic Letters Jul. 4, 1996 vol. 32 No. 14.

M.R. Smit, Phased Array of Optical Waveguides Provides Spacial Separation of Different Wavelengths, Electronics Letters Mar. 31, 1988, vo. 24, No.7.

J.B. Stark, Cascaded WDM Passive Optical Network with a Highly Shared Source, IEEE Photonics Technology Letters, vol. 9, No.8, Aug. 1997.

Shu Lin et al, "Error Control Coding Fundamentals and Applications", Prentice–Hall Inc., 1983; pp. 141 to 180.

* cited by examiner

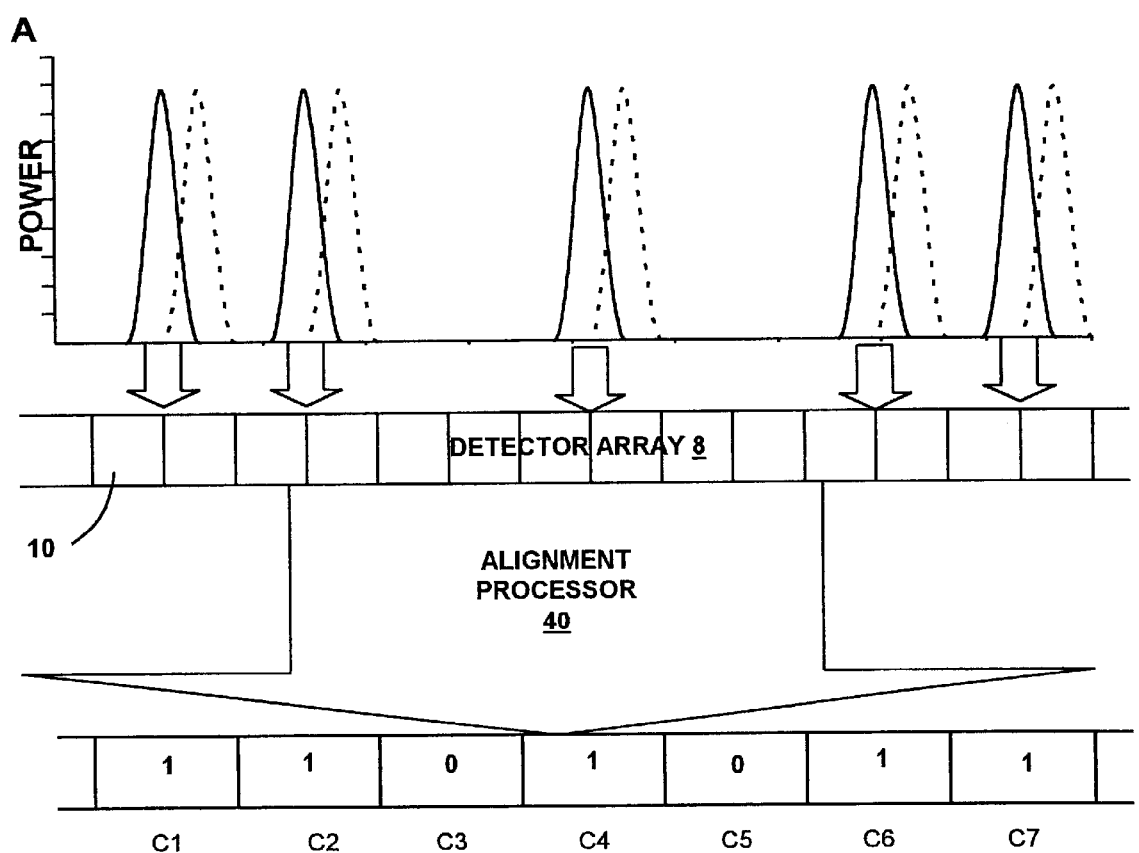

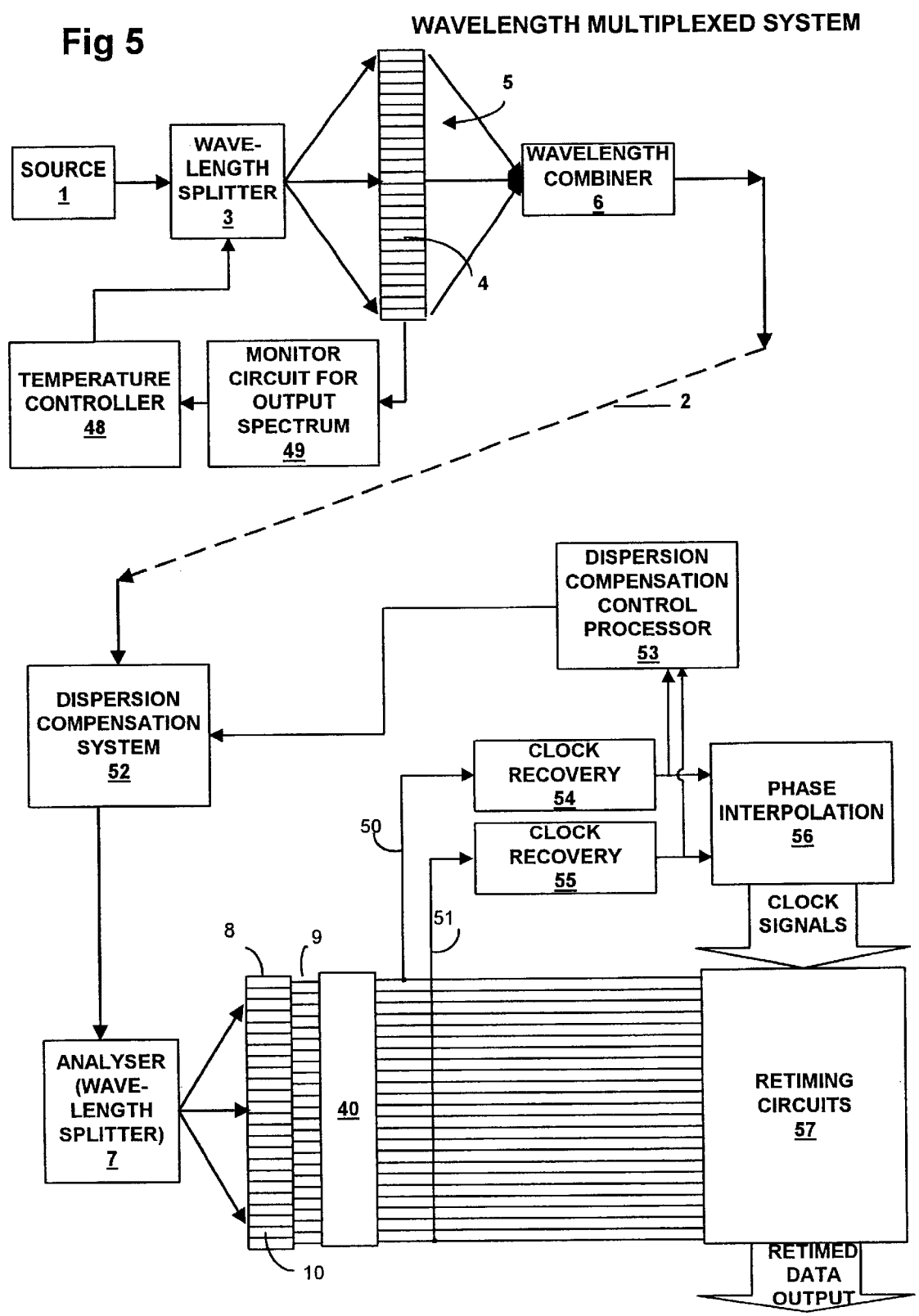

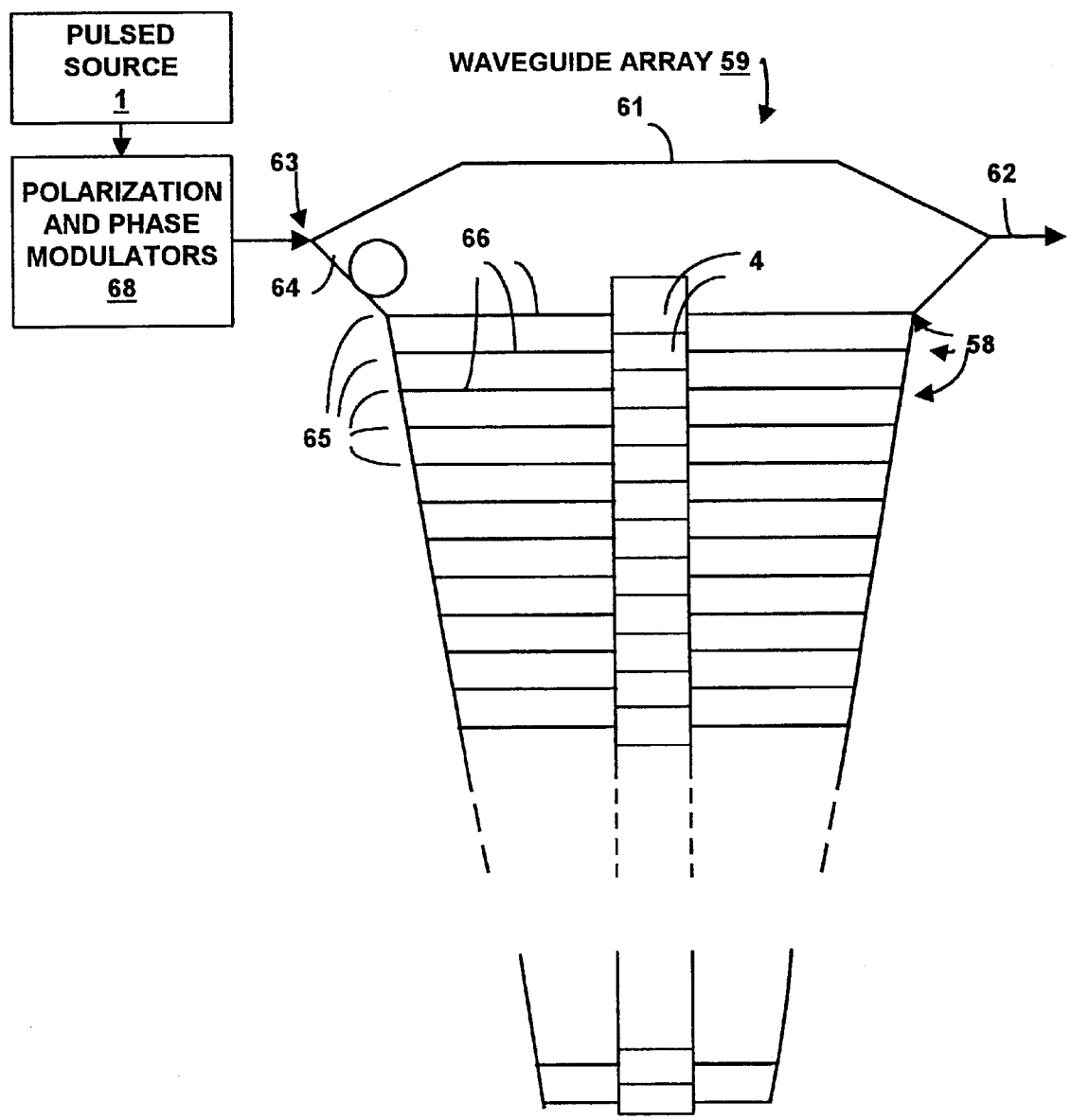

DELAY ELEMENTS OF FOURIER MODULATOR

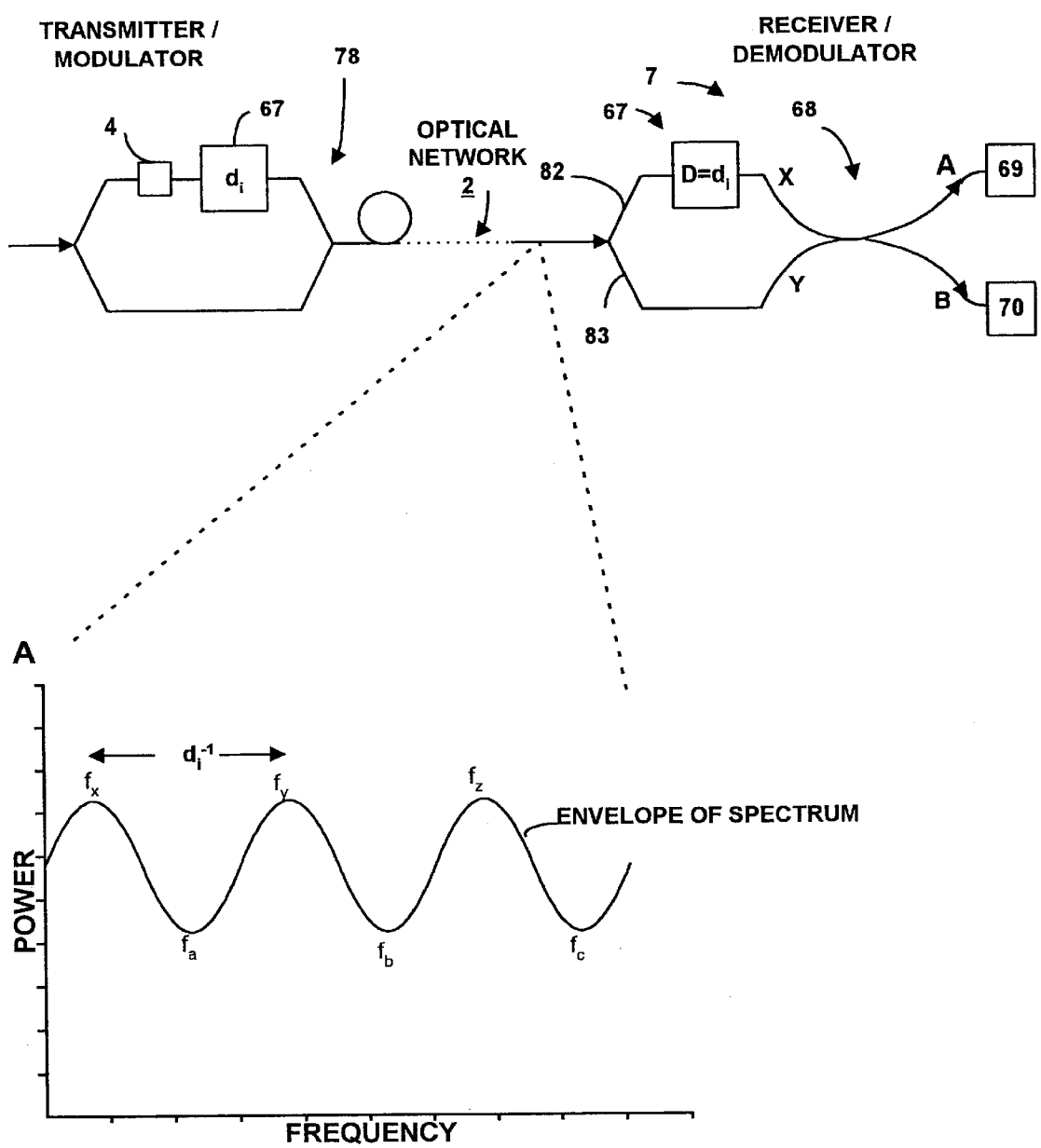

DETECTOR OF FOURIER MODULATION

3 DB COUPLER

FOURIER MODULATOR WITH CONTROL TO PREVENT SYSTEMATIC DRIFT OF DELAY VALUES

DETECTOR OF SPECTRAL MODULATION
WITH CONTROL TO PREVENT SYSTEMATIC
DRIFT IN DELAY VALUES

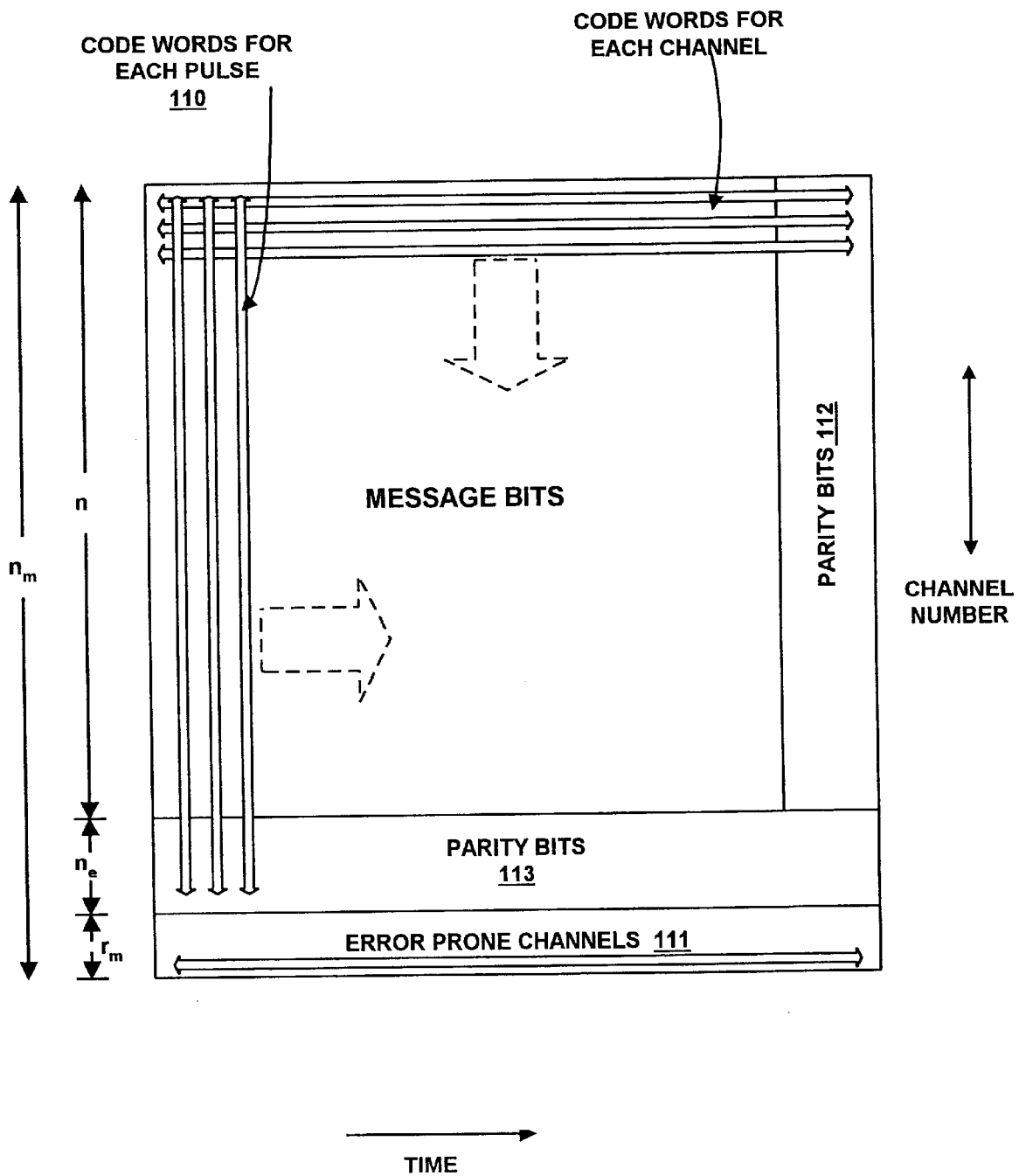
Fig 11     ERROR CODING FRAME

MULTIPLEXED TRANSMISSION OF OPTICAL SIGNALS

FIELD OF THE INVENTION

This invention relates to high-capacity optical transmission systems in which each optical pulse is multiplexed to carry multiple bits of information.

BACKGROUND OF THE INVENTION

Existing telecommunications systems typically transmit optical signals over optical fibres with a pulse rate of 10 Gb/s and, for example, use wavelength division multiplexing to transmit eight channels simultaneously, thereby achieving a data rate of 80 Gb/s per fibre. Transmission of optical signals is possible over about 400 km, using appropriate optical amplifiers, before conversion to the electrical domain is required to effect further regeneration.

It is estimated that future requirements of long distance traffic will require a transmission capacity greater than 1 Terabit per second per fibre. This increase in performance cannot simply be accommodated in such systems by increasing the bit rate per channel because of the onset of non-linear effects such as self-phase modulation and because the associated electronic processing at increased serial data rates becomes prohibitively expensive. Similarly, increasing the number of channels per pulse presents difficulties. Currently each channel is provided by a separate laser source whose output is filtered to a respective channel wavelength, the wavelengths being separated by guard bands to provide suitable tolerance to drifting due to environmental effects or ageing and, coupled with the limited bandwidth of laser amplifiers used for optical repeating systems, a limitation therefore exists on the number of channels which can be added to expand the data handling capacity of the system.

It is known from De Souza et al, Optics Letters vol. 20, no. 10, p.1166–8, to provide wavelength division multiplexing using a single broadband femtosecond source by slicing the spectral bandwidth into 16 channels which are modulated individually. De Souza proposes using a diffraction grating and collimating lens to disperse light from the source onto a modulator array chip and to recombine the component wavelengths into an output beam for transmission to a receiver. A disadvantage of this technique is the size of the diffraction grating and associated optics.

A similar arrangement is proposed by Knox et al in U.S. Pat. No. 5,526,155 with the additional proposal that the diffraction grating could be replaced by a suitable wavelength splitter such as a Dragone wavelength router as described in C. Dragone, "An N×N Optical Multiplexer Using a Planar Arrangement of Two Star Couplers", IEEE Photonics Technology Letters, vol. 3, no. 9, pp812–815, September 1991. The Knox reference proposes that each channel is formed by many different longitudinal modes of the optical source, the output of a pulsed laser typically having a spectrum in which a series of closely spaced peaks, sometimes referred to as modes of the laser. It is proposed by Knox that 250 or more different channel signals may be generated in this manner to provide a transmission capacity of 25 Gbits/sec.

It is known from Shao et al, "WDM Coding for High-Capacity Lightwave Systems", Journal of Lightwave Technology, vol. 12, no. 1, January 1994, to provide error detection and correction coding in a wavelength division multiplexed optical system where n channels are provided by separate sources of respective wavelengths and parallel word transmission occurs such that n=k+r where k equals the number of data bits per word and r equals the number of parity bits per word. A Hamming coding scheme is utilised to define the calculation of parity bits and the data recovery process at the receiver.

SUMMARY OF THE INVENTION

It is an object of the present invention to provide an improved multiplexing technique to allow transmission capacity to be increased to a rate in the region of 1 Terabit per second per fibre or more using a pulse repetition rate of the order of 1 GHz.

It is a further object of the present invention to provide error correction capable of dealing with both failure of individual channels in a multiplexed system and dealing with burst errors affecting a number of successive pulses. It is a further object of the present invention to provide an improved wavelength division multiplexing method with a large number of channels and controlling the stability of individual channel outputs.

It is a further object of the present invention to provide an improved method of generating clock signals when detecting multiplexed signals.

It is a further object of the present invention to provide an improved method of multiplexing optical pulses using a broad spectrum source.

It is a further object of the present invention to provide a method of optical communication in which the receiving and detection of received pulses is tolerant to systematic drift in the modulation and transmission of the optical pulses.

It is a further object of the present invention to provide a method of optical communication using multiplexed optical pulses which is tolerant to the occurrence of error prone channels.

According to the present invention there is disclosed a method of optical communication comprising the steps of;
   transmitting a train of optical pulses;
   multiplexing each pulse to provide a plurality of channels; and
   applying error correction coding to data carried by the channels using both interchannel coding and serial coding of individual channels.

Data transmission is thereby rendered more robust under a range of error conditions such as the onset of failure of one individual channel and also the occurrence of a burst of errors affecting a number of channels simultaneously.

Preferably the serial coding is enhanced by interleaving. BCH codes such as Hamming codes may conveniently be used.

According to a further aspect of the present invention there is disclosed a method of wavelength division multiplexing of optical signals for use in optical communications comprising the steps of;
   generating optical signals by operation of a single laser source which is pulsed to have a spectral content comprising a series of spectral lines;
   inputting the pulses to a dispersive device for spatially dispersing a set of the spectral lines for each pulse into respective output components, the dispersive device comprising an array of waveguides having a range of incrementally different lengths arranged in a phased array configuration;
   monitoring the extent to which the frequency selective properties of the waveguide array are matched to the spectral lines; and
   controlling, in dependence upon the result of monitoring, the operation of at least one of the dispersive device and the laser source to maintain substantial uniformity with respect to time of the output components of the optical pulses.

The monitoring step preferably comprises monitoring the output of the waveguide array for a selected one of the spectral lines and controlling the operation of the dispersive device by regulating the temperature of a temperature controlled environment within which the waveguide array is located.

According to a further aspect of the present invention there is disclosed a method of optical communication comprising the steps of receiving optical pulses which are multiplexed to define a plurality of channels;

detecting the pulses to obtain temporally dispersed channel signals for the respective channels; and generating clock signals for the respective channel signals for use in subsequent signal processing;

and wherein the generating step comprises extracting first and second clock signals in respect of first and second channel signals, and determining clock signals for remaining channel signals by interpolation.

Conveniently the first and second channel signals are selected as the earliest and latest received of the channel signals respectively. The interpolation in a preferred embodiment is linear with respect to temporal dispersion.

According to a further aspect of the present invention there is disclosed a method of optical communication comprising the steps of;

transmitting a train of optical pulses; and multiplexing each pulse to provide a plurality of channels;

the multiplexing step comprising;

modulating the spectrum of the pulse with a set of spectral modulations associated with respective channels such that a respective channel value for each channel is represented by an amount of corresponding spectral modulation, wherein each spectral modulation is defined by a respective characteristic of modulation as a function of frequency and wherein the characteristics are mutually orthogonal in frequency space.

Such spectral modulation (referred to below as Fourier modulation) may conveniently be in the form of sinusoidal modulations in frequency space which may then be detected by Mach-Zehnder filters at a receiver.

Such spectral modulation enables the entire frequency content of the pulse to be utilised for each channel.

According to a further aspect of the present invention there is disclosed a method of optical communication comprising the steps of receiving optical pulses which are multiplexed to define for each pulse a plurality of channels such that a measurable parameter defining a property of the pulse has a first set of distinct values corresponding to respective channels;

detecting each received pulse by means of a detector array comprising detectors which are responsive to a second set of respective values of the parameter and which detectors output respective detector signals;

wherein the second set is greater in number than the first set so that the number of detector signals is greater than the number of channels;

and analysing the detector signals to extract channel signals representative of channel values carried by the respective channels.

The need for precise alignment of the detector array with any systematic drift in the measurable parameter is thereby avoided, as for example in the case of multiplexing by wavelength division multiplexing where the measurable parameter is optical frequency and the detector array consists of detectors responsive to dispersed frequency components.

According to a further aspect of the present invention there is disclosed a method of optical communication comprising the steps of;

transmitting a train of optical pulses;

multiplexing each pulse to carry a set of channels;

receiving the optical pulses;

monitoring for each channel a respective error rate in the received pulses;

selecting on the basis of most favourable error rate performance a subset of the set of channels to carry a first data stream;

designating remaining channels on the basis of being relatively error prone as non-selected channels to carry a second data stream; and wherein the first and second data streams comprise respective error detecting codes whereby the monitoring step determines the error rate performance therefrom.

Optimum performance from the system may thereby be obtained by using the channels for which the rate of error detection is minimum.

The present invention also discloses communications systems and apparatus forming components of such systems for use in the above methods.

Preferred embodiments of the present invention will now be described by way of example only and with reference to the accompany drawings.

BRIEF DESCRIPTION OF THE DRAWINGS

FIG. 4 is a schematic representation of a detector array;

FIG. 5 is a schematic representation of a wavelength multiplexed system using a single pulsed source;

FIG. 6A is a schematic diagram of a further embodiment of the present invention having a Fourier modulator;

FIG. 7 is a schematic representation of the encoding and decoding of a single channel of the Fourier modulator of FIG. 6A;

FIG. 11 is a schematic representation of a forward error correction scheme.

DESCRIPTION OF PREFERRED EMBODIMENTS

Figure 1:
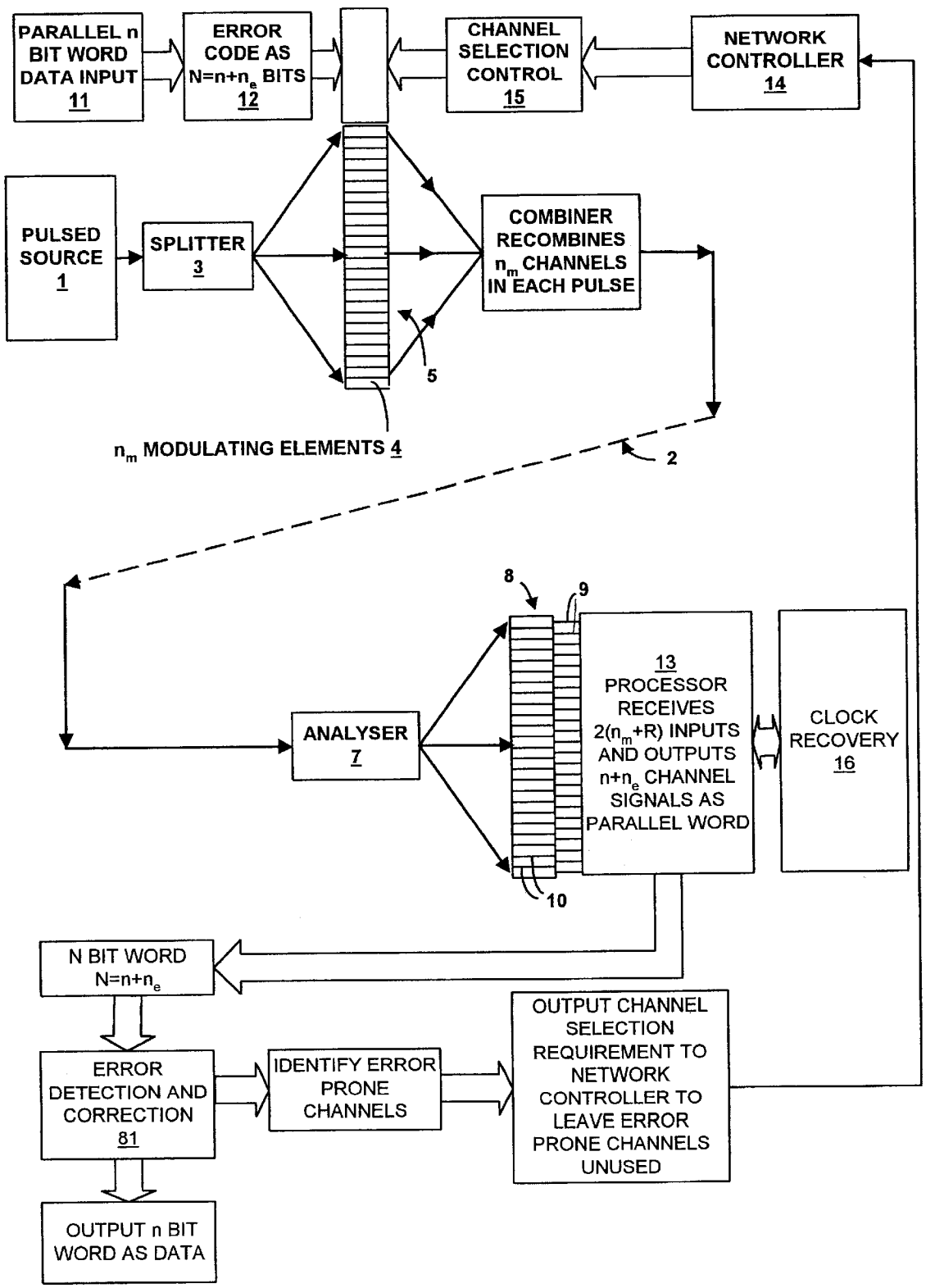
FIG. 1 is a schematic diagram of an optical communications system with multi-channel multiplexing of pulses from a single optical source.

FIG. 1 shows schematically a high-capacity optical transmission system in which optical pulses from a single laser source 1 having a relatively broad bandwidth of 16 nm are subject to a multiplexing process enabling each pulse to carry a large of number of channels. In the present context, the number of channels is used to denote signal carrying capacity of an optical network 2 over which the pulses are transmitted, and, typically, each channel can carry one bit of information per pulse. A data input 11 allows the input of a parallel n bit word, after suitable processing, to be encoded upon the optical pulse by means of the modulator array 5. Such processing may for example include error coding in a forward error coding unit 12 which adds the parity bits to the parallel word.

Pulses from the source 1 are divided by a splitter 3 in a manner suitable for presentation to modulating elements 4 of a modulator array 5. One possible example of a splitter 3 would be a wavelength dispersive element as described below with reference to FIG. 3 for spacially separating the pulse into components having distinct respective wavelengths. The splitter 3 however in its general context is not limited to such wavelength division multiplexing methods and could for example comprise simple division into components of equal amplitude for presentation to modulating elements 4 which apply respective distinct phase modulations as described below with reference to FIGS. 6 to 8.

Components of the optical pulse modulated by the modulator array 5 are recombined in combiner 6 and are output to the optical network 2 to be received at a remote location where an analyser 7 divides the received pulse for presentation to a detector array 8. Electrical outputs 9 from detecting elements of the detector array 8 are input to a processor 13 which interprets the electrical outputs to recover the n-bit word for subsequent processing including retiming by means of clock recovery circuit 16.

The system includes a degree of redundancy in the number of channels capable of carrying user data and also provides error detection and correction in order to allow for the occurrence of occasional bit errors or varying degrees of failure of individual channels. Input data is formulated as parallel words of n bits where in the present example n=1014. The data input word is error coded using a BCM (Bose-Chaudhuri-Hocquenghem) code and the resulting code word of $N=n+n_e$ bits is transmitted to the modulator array, thereby allowing the entire code word to be transmitted in a single pulse. The number of modulating elements forming the modulator array 5 is therefore required to be greater than $n+n_e$ where $n_e$ is equal to the number of parity bits added by the error coding. The number $n_m$ of modulating elements is chosen to provide a degree of redundancy such that $$n_m = n + n_e + r_m N + r_m$$

where $r_m$ is a number of redundant channels available in the modulator array 5. (The term 'redundant' is, in the present context, used to indicate that these channels are not selected to carry user data. The 'redundant' channels may however be used for other purposes.) The provision of such redundant channels at the transmitter therefore allows N channels to be selected from $n_m$, leaving up to $r_m$ channels to be designated as error prone channels should any be identified as such.

Similarly, at the receiver, a degree of redundancy is provided. A number R of redundant channels available at the detector is accommodated by increasing the number of detector elements 10, the number R being greater than rm to allow for systematic errors and drift occurring over time in the manner of transmission via the optical network 2. In order to avoid the need for precise alignment relative to the received signals or modulating elements 4, the number of detecting elements 10 is further doubled to provide interleaving or intermediate detecting elements so that for example, where a series of parameters $d_i$ define the distinguishing characteristic between channels, intermediate detection elements are provided to respond to values $d'_i = d_i + \frac{1}{2}(d_{i+1} - d_i)$.

Consequently, $n_d = 2(n_m + R)$ detection elements 10 are provided and are connected to a processor 13 which receives the resulting $2(n_m + R)$ inputs, the processor interpreting the inputs and outputting $N = n + n_e$ channel signals as a parallel word. Typical values required to achieve 1 Tb/s with a pulse rate of nominally 1 GHz are n=1014, $n_e$=10 and R=10.

An example of forward error correction for use in the present embodiments is a block code of the BCH (Bose, Chadhuri, Hocquenghem) type where the number of parity bits required depends upon the number of errors per code word for which the coding system is capable of providing correction. For most applications, a Hamming single error correcting code will be sufficient. The typical values referred to above for N and ne correspond to a Hamming code.

FIG. 11 shows schematically the manner in which encoded bits may be framed where forward error correction is utilised. For each time sample, n message bits are encoded by interchannel coding to provide ne parity bits 113 and transmitted as code words 110 having $n+n_e$ channel bits. The diagram of FIG. 11 shows the framing of user data channel bits together with redundant or error prone channel bits 111 associated with the excess number of modulating elements. (For convenience, the error prone channels are shown schematically in a common block.) For each time frame in a given user data channel, further forward error correction is performed by serial coding to provide additional time frame parity bits 112, the resulting code words 114 thereby providing for each channel an additional mechanism for correcting errors. If for example errors are confined to a single channel, the error correction in the "vertical direction" of FIG. 11 for a single sample time is capable of correcting the single error and this process will be repeated at successive sample times. If on the other hand a series of errors occur at a single sample time in more than one channel, error correction using the time frame parity bits 112 is capable of correcting these errors by correction of a single error bit in each one of the code words 114.

In order to allow for error correction of more extensive burst errors covering more than one channel and more than one adjacent time slot, the technique of data interleaving may be utilised so that bits from adjacent time samples belong to different error correcting frames.

An error detection and correction unit 81 as shown in FIG. 1 extracts the n bit word of data and, in the process of doing so, identifies error prone channels by statistical analysis of the results of error detection. The use of such error prone channels for communicating user data is avoided by outputting a selection requirement to a network controller 14 which activates a channel selection control circuit 15 to reallocate the channels used by the modulating elements 4 for user data. The error prone channels are then accommodated within the $r_m$ redundant channels 111 provided in the modulator array 5.

Those channels which are identified as error prone are then used to carry an error detecting code which is detected and monitored in order to assess the performance of the channel over time. If for example the performance of a given error prone channel improves whereas other channels currently carrying user data deteriorate, the designation of redundant error prone status can be changed in order to continually utilise for user data those channels likely to provide the best performance.

In a preferred embodiment, a channel which has been designated as being an error prone channel must improve its performance in terms of error rate by a factor of 10 times better than the next candidate channel before losing the designation of being error prone so as to return to use in communicating user data. The assessment of error rate in an error prone channel in a preferred embodiment requires an error count to be accumulated for 5 milliseconds in hardware, the accumulated values then being read by the controller 14.

More generally, the above process may be regarded as selecting a subset of the available channels to carry a first data stream on the basis of most favourable bit error rate performance, the first data stream consisting of code words which include the user data. Remaining channels are designated as being non-selected channels carrying a second data stream, also carrying error detecting code. The non-selected channels may still carry user data if required although preferably at a lower bit rate or alternatively using an error correction code capable of correcting a greater number of errors.

The channels will generally be coded with binary data but may also carry non-binary coding, such as in the case of duo-binary signalling, and in this case a non-binary BCH code such as a Reed-Solomon code.

WDM Method:

A first example of a modulation and demodulation method will now be described with reference to FIG. 5, the method being one of wavelength division multiplexing (WDM). The system of FIG. 5 corresponds broadly to the system of FIG. 1 and omits some detail such as error correction for clarity.

Figure 2:
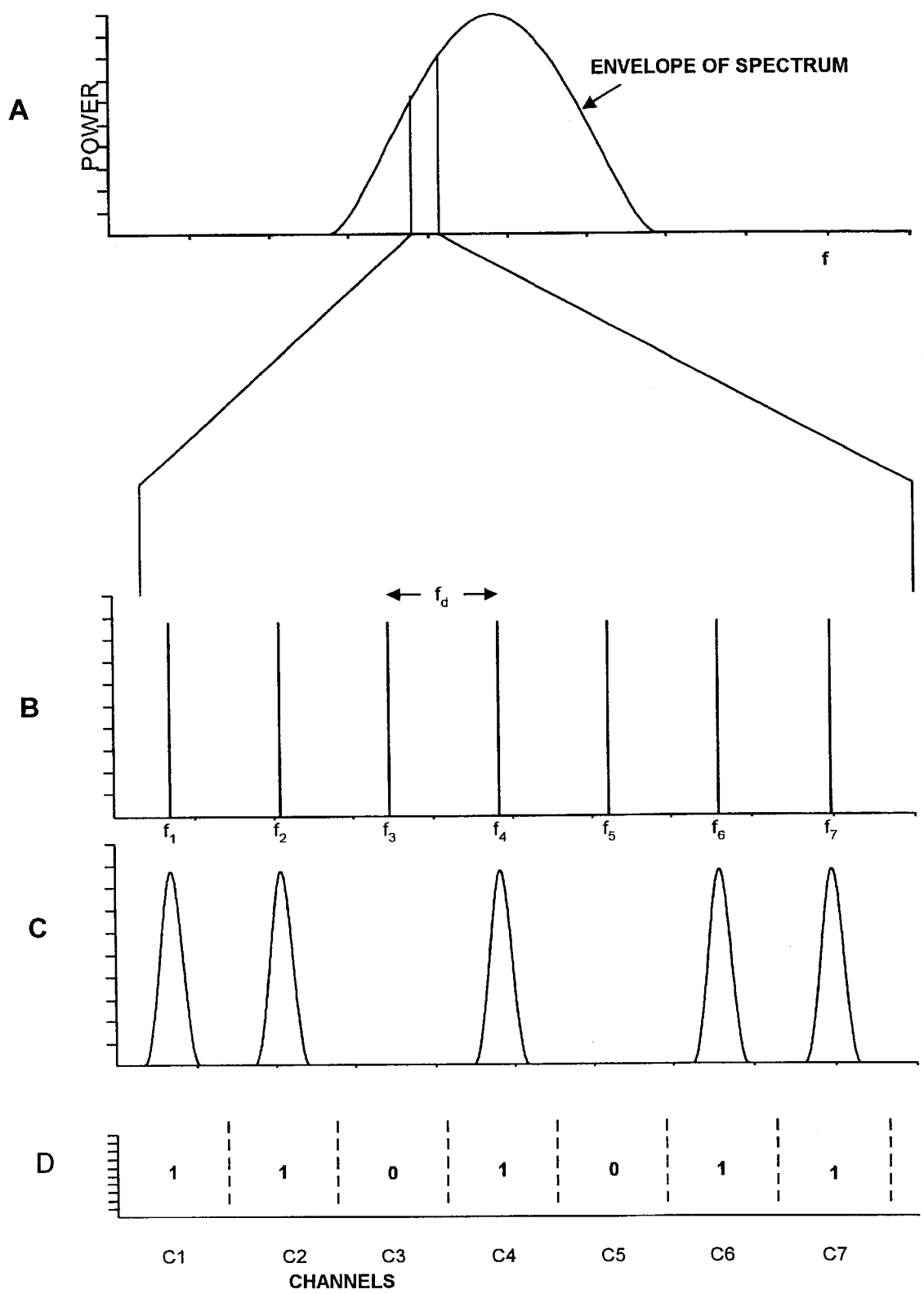
FIG. 2 is a graphical representation of the spectrum of a pulsed laser source showing in curve A a general envelope of the source spectrum, in curve B detail of the peaks of the spectrum corresponding to laser modes, curve showing the result of modulation and graph D showing the corresponding channels.

FIG. 2 shows graphically at curve A the envelope of the spectrum of a pulse laser source, the detailed fine structure being shown at graph B to comprise a series of modes which are equispaced in frequency by a frequency interval $f_d$ which is equal to the pulse rate at which the laser source 1 is pulsed. In this example, adjacent modes are selected as available channels in the modulator array 5 and the laser source is pulsed at 2 GHz. A typical output of the wavelength combiner 6 of FIG. 5 is illustrated in graph C of FIG. 2, corresponding to transmitted bits shown in graph D, and showing the effect on spectral line shape due to modulation.

Figure 3:
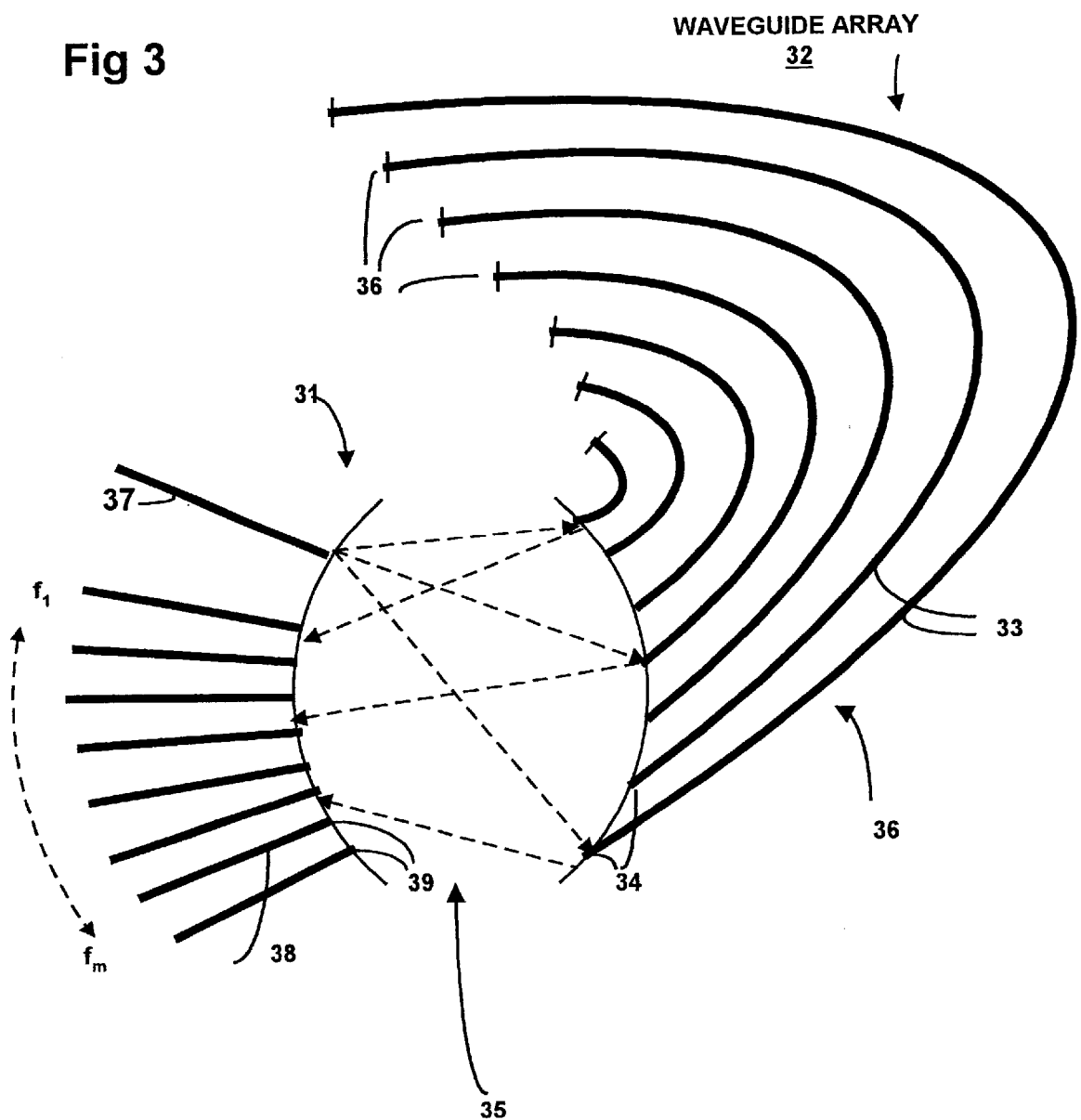
FIG. 3 is a schematic representation of a wavelength splitter for use in the system of FIG. 1.

FIG. 3 shows schematically a wavelength dispersive element for spacially dividing the pulse into wavelength components $f_1$ to $f_m$, thereby constituting an embodiment of the splitter 3 of FIG. 5, based on a wavelength routing device proposed by C. Dragone, as referenced above. In FIG. 3, each heavy solid line represents a waveguide.

The wavelength routing device 30 of FIG. 3 is based on a star coupler 31 and an optical waveguide array 32 in the form of a series of waveguides 33 defining respective optical path lengths which differ incrementally from one another. Each of the waveguides 33 has a respective input/output end 34 defining a part circular boundary of a free space region 35 and each has a free end 36 terminating in a respective reflector.

Optical pulses from the source 1 are input to the free space region 35 via an input waveguide 37 and a set of output waveguides 38 have their free ends 39 presented to the free space region 35 so as to receive outputs dispersed spacially from the waveguides 33 according to their wavelengths. The waveguide array 32 therefore may be regarded as being equivalent to a grating used for spacial dispersion of wavelengths.

FIG. 3 is to be regarded as schematic and representing only a limited number of both output waveguides 38 and grating waveguides 33, the number of output waveguides 38 in practice corresponding to the number of frequencies required and the number of array waveguides being typically at least four times the number of output waveguides.

The wavelength routing device 30 has a spectral response which is accurately aligned to the spectrum of the laser source 1 so as to act as a filter having a response represented by peaks of the spectrum shown in FIG. 2 Graph B. The filter is temperature-tuned to the source 1 by means of placing the filter in a temperature controlled environment and controlling the temperature using a feedback loop driven by a measure of the match in frequency between the filter and source characteristics. A suitable method of providing such measurement is to utilise a spectral line at one end of the source spectrum and a corresponding output of the filter to a detector. In the wavelength multiplexed system illustrated schematically in FIG. 5, temperature tuning of the source 1 is represented schematically by a monitor circuit 49 which provides an input to a temperature controller 48 which controls the temperature environment of the wavelength splitter 3.

After transmission through the optical network 2, each received pulse is divided into separate wavelength components by the analyser 7 which may for example be a waveguide array of the type shown in FIG. 3 and in which the wavelength dispersed output is directed onto a detector array 8 as shown schematically in FIG. 4 in which the spectral power falling onto the detector array is illustrated graphically in graph A. The detector array 8 comprises an array of detector elements 10 of which the number $n_d$ of detector elements 10 is more than double the number of channels to be detected in order to allow for systematic drift in the position at which the signals are dispersed onto the detector array 8. Each peak in the spectrum will generally be detected by two adjacent detector elements 10. An alignment processor 40 receives the output signals from each of the detector elements 10, combines the output from each pair of detector elements 10, and maps the output onto binary values of transmitted channels.

In the presence of frequency drift, the power distribution in graph A of FIG. 4 will move to one side as represented by the broken line graph and the outputs from the individual detector elements 10 will vary such that each wavelength peak will still be detected by two adjacent detector elements although with different proportions being detected by each of the pair. The output alignment processor is invariant to such drift.

By such an arrangement, the need for repeated calibration or active tracking control to achieve precise alignment of the detector array 8 is avoided.

The wavelength components of a pulse are likely to be subject to differential delay, such wavelength dependent (temporal) dispersion being increasingly problematic with increasing transmission distance. The (temporal) dispersion is at least partially compensated optically by transmission through a (temporal) dispersion compensating system 52. Some residual (temporal) dispersion is however likely to remain. Clock recovery of the individual wavelength channels may generally therefore require each channel to be provided with an individual clock recovery circuit.

In the present example, however, clock recovery is simplified by an interpolation technique as illustrated schematically in FIG. 5. Clock recovery signals 50 and 51 are sampled from the earliest and latest received output channels C1 and CN which corresponds to the maximum and minimum frequencies at which data is transmitted. In the preferred embodiment, C1 and CN are channels dedicated to only carry clock signals. The phases of clocks required for each of the intermediate data channels C2 to CN−1 is then obtained by interpolation of the phases detected for each of these extreme clock signals. The interpolation is linear in the preferred embodiment but, if necessary, a non-linear interpolation could be effected where appropriate. Individual clock signals are derived by adding together weighted versions of the sinusoidal clock signals derived from the C1 and CN channels, the weights being varied linearly or non-linearly as required.

In FIG. 5, the (temporal) dispersion compensation system 52 is adaptively controllable and is controlled by a control signal derived from processing the clock recovery signals, as illustrated schematically by (temporal) dispersion compensation control processor 53.

In FIG. 5, a phase interpolation circuit 56 receives clock recovery signals from clock recovery circuits 54 and 55 and by a process of interpolation derives appropriately phase shifted clock signals for each of the channels C2 to CN−1, the clock signals being output to retiming circuits 57 which include, for each of these channels, a retiming D-type flip-flop. Retimed data output is thereby produced as a parallel word, subsequently processed for error detection and correction as described above with reference to FIG. 1.

Fourier Modulation Method

A second example of multiplexing in an optical transmission system of the type described above with reference to FIG. 1 will now be described. FIG. 6A illustrates a method of modulating a single optical pulse to carry a large number of channels by a spectral modulation technique which is alternatively referred to herein as Fourier modulation. Unlike the above described wavelength division multiplexing technique, the Fourier modulation technique encodes the optical pulse such that each channel utilises a broad bandwidth of the pulse i.e. a large number of the modes of FIG. 2, Graph B, the same bandwidth being available to each of the channels, and the channels being associated with respective periodic modulations in frequency space of the spectrum of the transmitted pulse. The term modulation in this context implies a characteristic imposed into the envelope of the spectrum of the optical pulse and which is generally time invariant for the duration of the pulse (as described below with reference to FIG. 7A).

A periodic modulation of the spectrum with a specific period in frequency space may for example be achieved using a Mach Zehnder interferometer in which mutually coherent samples of the pulse are recombined after introducing a delay $d_i$ in one component, the resulting modulation in frequency space being a sinusoid having a periodicity expressed as a frequency increment equal to the inverse of the delay.

The Fourier modulator 60 of FIG. 6A will be described using corresponding reference numerals to those of preceding FIGS. where appropriate for corresponding elements. Pulses from a pulsed optical source 1 are input to a waveguide array 59 in which a reference waveguide 61 communicates with an output waveguide 62 so as to introduce a delay $d_r$. At the input to the reference waveguide 61, a 3 dB splitter 63 divides one half of the power in the pulse into a waveguide 64 leading to a splitter 65 which in turn diverts a portion of the signal power into a respective delay waveguide 66. Successive 30 dB splitters 65 similarly divert signal power into respective delay waveguides 66, the length of the delay waveguides 66 being mutually different and increasing incrementally by S in the array to define a series of time delays $d_i$ where $$d_i = 2d_r$$
$$d_2 = 2d_r + \delta$$
$$d_3 = 2d_r + 2\delta$$
$$\vdots \quad \vdots \quad \vdots$$

For example, D=512 p sec and δ=0.5 p sec to provide 1024 different values of $d_i$. Each of the delay waveguides 66 communicates with a respective modulating element 4 of a modulator array 5 which, in the example of FIG. 6A, is illustrated schematically as a transmission type modulator. The optical pulse components conducted through the delay waveguides 66 emerge from the modulator elements 4 and are recombined with the remainder of the pulse transmitted via the reference waveguide 61 using appropriate couplers 58.

Actuation of each of the modulating elements 4 thereby allows a distinct spectral modulation to be introduced into the optical signal within the pulse which is output via the output waveguide 62.

Figure 6B:
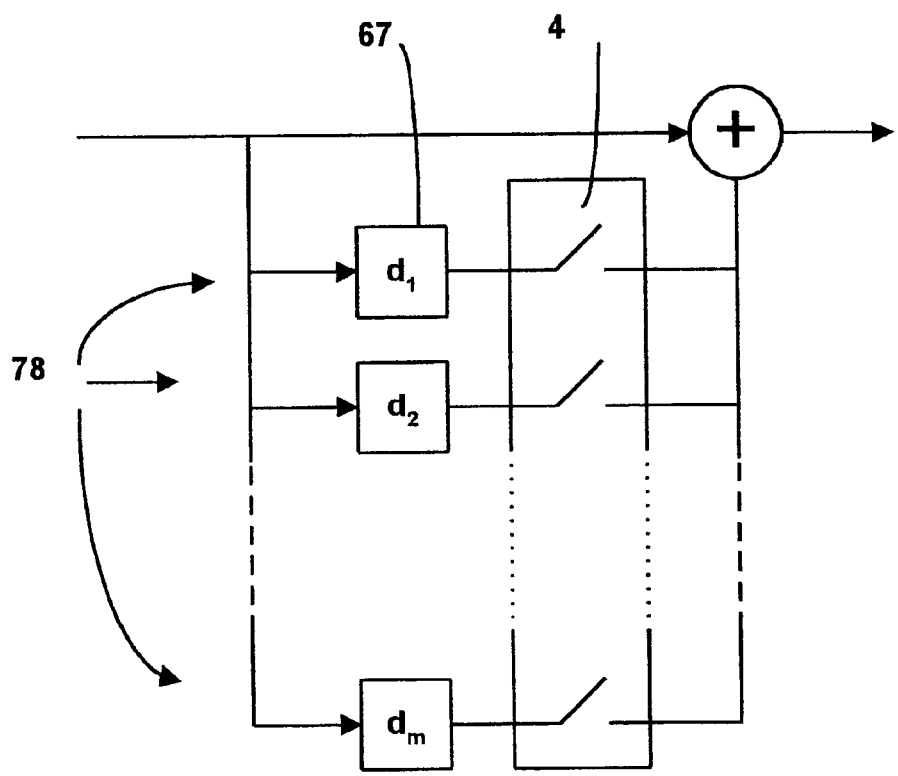
FIG. 6B is a schematic representation of the delay elements and multiplexing array corresponding to FIG. 6A.

The pulses are introduced to the array via polarization and phase modulators 68 which act to invert the optical phase of each successive pulse and shift the polarization by 90 degrees between successive pulses. These measures reduce the likelihood of coherent addition between successive pulses. The nature of the spectral modulation is explained schematically in FIG. 7 in which a spectral modulation unit 78 in the form of a Mach Zehnder interferometer performs spectral modulation which is detected by an analyser 7 in the form of a Mach-Zehnder filter and where in each case a delay $d_i$ is represented by a respective delay element 67. Division and recombination after introducing a delay into one arm of the interferometer 78 as shown in FIG. 7 results in a modulation of the spectral content of the pulse. This modulation is illustrated schematically in graph A of FIG. 7 which shows a generally sinusoidal modulation in frequency space of the power, peak power being shown at a series of frequencies $f_x, f_y, f_z, \ldots$ and minimum power being shown at a series of frequencies $f_a, f_b, \ldots$ The periodicity of this modulation in frequency space is determined by the value of $d_i$ (the frequency interval between peaks=$(d_i)^{-1}$) and frequencies $f_x, f_y, f_z, \ldots$ are frequencies for which a phase difference between the outputs of the two arms of the interferometer is an even multiple of π, thereby giving constructive interference. Frequencies $f_a, f_b, f_c, \ldots$ are frequencies for which a phase difference between the outputs is an odd multiple of π, thereby giving destructive interference. Where a series of interferometers with distinct values of $d_i$ are provided as in the case of the waveguide array of FIG. 6A, a set of distinct, orthogonol modulations in frequency space are possible. FIG. 6B shows schematically a representation of the delay waveguides 66 of FIG. 6A using the delay element notation of FIG. 7. The summation of these distinct sinusoidal modulations in frequency space may be regarded as constituting a Fourier series and hence the spectral modulation may be termed Fourier modulation in the present context.

Each of the delay elements $d_i$ is shown in FIG. 6B in series with a respective modulating element 4 so that the associated modulation is only present in the output signal when the respective modulator element 4 is activated to allow conduction of the optical signal and allow interference to occur. The delay elements $d_i$ are arranged in parallel, thereby avoiding mechanical issues i.e. difficulties of construction.

Figure 9:
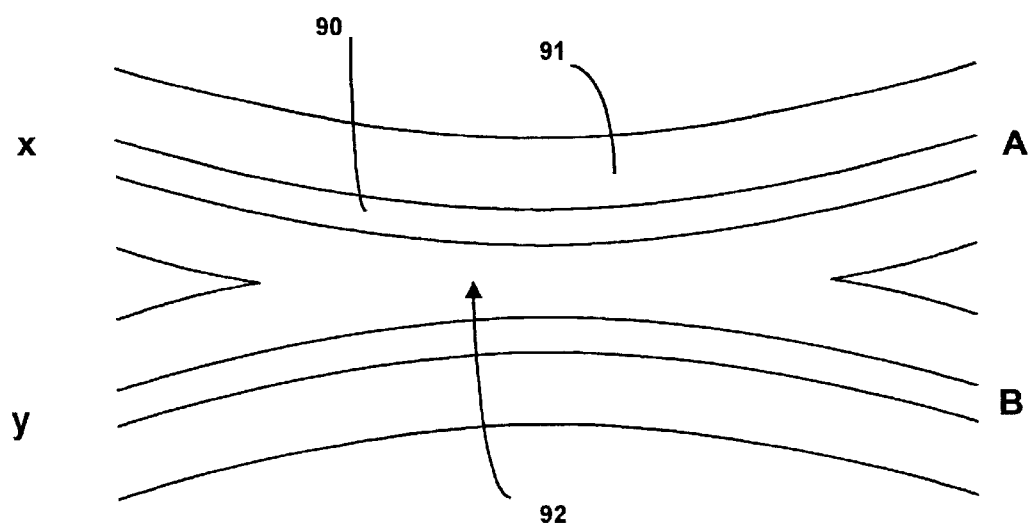
FIG. 9 is a schematic drawing of a 3 dB coupler as used in the detector of FIG. 8.

Detection in the received output at the analyser 7 of FIG. 7 makes use of a property of a 3 dB coupler 68 which receives inputs X and Y and delivers outputs A and B to detector elements 69 and 70 respectively. A 3 dB coupler is illustrated in FIG. 9 in which two waveguides are brought into close proximity such that waveguide cores 90 are sufficiently close to allow an exchange of radiation to occur, in dependence upon the length of interaction region 92 common to the cladding 91 of each waveguide.

A property of the 3 dB coupler 68 is that, for coherent inputs X and Y, the inputs will be coupled into the outputs in a manner such that the distribution of power in the outputs A and B is generally dependent upon the relative phase of the inputs X and Y. Consequently, a 3 dB coupler may be configured such that any components of a particular frequency which are mutually in-phase for the inputs X and Y will be output to A and detected by the detector 69 of FIG. 7 whereas components which are out of phase will be output to B and detected by detector 70. In the example shown, components of frequency $f_x$, $f_y$, $f_z$, . . . will appear in-phase when analysed using a Mach-Zehnder filter having a delay $D=d_i$ since by definition these frequencies correspond to a phase difference which is an even multiple of n for delay $d_i$. These frequency components will be coupled to the detector 69. Frequencies $f_a$, $f_b$, $f_c$, . . . however will appear as out of phase components of X and Y since by definition these frequencies correspond to a phase difference which is an odd multiple of $\pi$ for a delay of $d_i$ and will be coupled to detector 70.

The relative strengths of the in phase components $f_x$, $f_y$, $f_z$, . . . and out of phase components $f_a$, $f_b$, $f_c$, . . . will vary according to whether the pulse is spectrally modulated with delay $d_i$. The value of the differential output between detectors 69 and 70 can therefore be used to detect spectral modulation.

Figure 8:
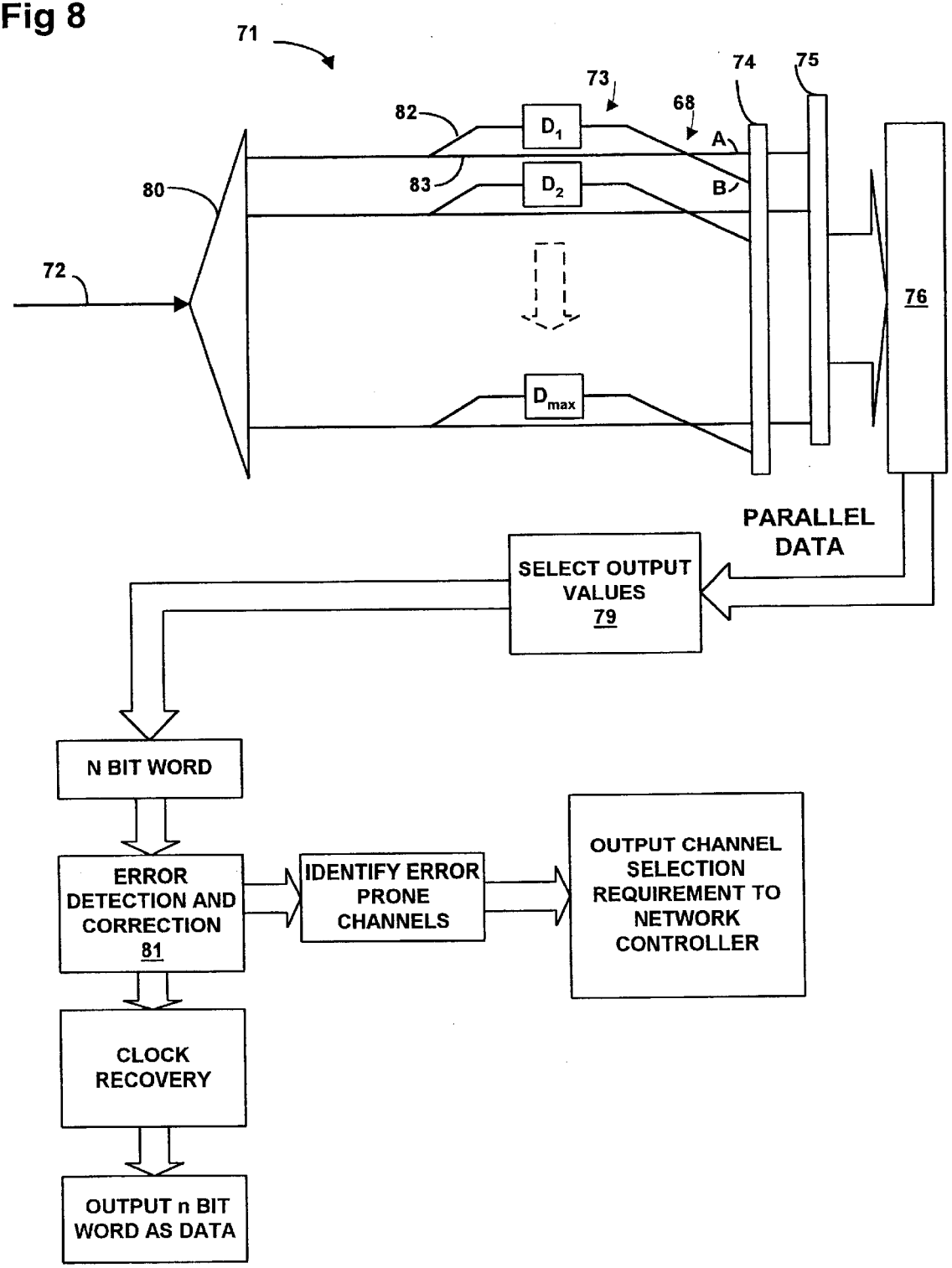
FIG. 8 is a schematic representation of a spectral modulation detector for use with the modulator of FIG. 6A.

A spectral modulation detector 71 for detecting $2(n_m+R)$ different spectral modulations is shown schematically in FIG. 8. Each pulse is received via an input waveguide 72 connected to a signal splitter 80 which divides and then amplifies the signal equally to be directed to a set of Mach-Zehnder filters 73. Each Mach-Zehnder filter 73 corresponds to the analyser 7 of FIG. 7 in which the pulse is divided into respective first and second arms 82 and 83 and transmission via the first arm subjected to time delay $D_i$ before recombining in a 3 dB coupler 68, the outputs A and B of which are connected to separate detectors. In the spectral modulation detector of FIG. 8, first and second PIN diode arrays 74 and 75 are used to detect the respective outputs A and B from each of the Mach-Zehnder filters 73 and the differential outputs for each signal component are processed by a differential amplifier array 76.

Each of the Mach-Zehnder filters 73 is tuned to provide a respective delay $D_i$, the values of the delays $D_i$ being selected to include values corresponding to each of the delays $d_i$ to $d_m$ used in the modulators of FIG. 6. For each instance of activation of a modulator 4, represented by closure of one of the switches 77 of FIG. 6B, a characteristic spectral modulation of period $d_i^{-1}$ in frequency space will be encoded into the spectrum of the pulse as illustrated in Graph A of FIG. 7 and this will be detected in the Mach-Zehnder filter 73 having the corresponding delay $D_i$ to produce a differential output. A parallel data word output from the differential amplifier array 76 will therefore be modulated accordingly. As in the case of the first example using WDM, the spectral modulation detector of FIG. 8 includes a degree of redundancy in that it comprises a number of Mach-Zehnder filters 73 which is more than twice the number of spectral modulation units 78 at the transmitter, the respective delay values $D_i$ at the detector comprising a set of m values equal to those of the spectral modulator 60 plus a set of m intermediate or interleaved values as well as R redundant values at the maximum and minimum extent of $d_i$.

Systematic errors occurring at the time of construction or appearing over time may therefore be accommodated by suitable signal recovery by inputting the data to a processor 79 operable to select output $n_m$ values of the transmitted word. Subsequent error detection and correction is carried out by a processor 81 to extract the n bit word of user data.

In the above examples, a 1024 bit word is modulated onto each pulse using a pulse repetition rate of nominally 1 GHz in order to achieve a data carrying capacity of the order of 1 Tb/s. Transmission may be by a single optical fibre with corresponding multiplexed data transmission operating in both directions. Optical pulse generation consists of generating a very narrow pulse which is then dispersed so as to fill most of the bit period in order to reduce peak power. The reduction in peak power has the advantage of avoiding non-linearities during transmission via optical fibres.

In the above described embodiment utilising Fourier modulation, the number of delay waveguides 66 is 1034 of which 10 represent redundant channels. The corresponding values of delay elements 67 are separated by increments of 0.5 ps over the range 517 to 1,033.5 ps. The nominal 1 GHz pulse rate is more precisely given as the inverse of the bit period i.e. $(1,034 \cdot 10^{-12})^{-1}$.

In the embodiment of FIG. 5, wavelength matching of the filter (wavelength splitter 32) is achieved by temperature control of the filter. Alternatively, wavelength matching may be achieved by regulating the pulse repetition rate of the source 1 in order to thereby variably control the values of the laser mode frequencies and the frequency spacing $f_d$ between mode frequencies $f_1$, $f_2$, $f_3$, . . . . At the receiver, detection of the pulse rate enables the receiving electronics to adapt to wavelength variation.

Alternatively, using the method of temperature controlling the filter, the degree of matching between the source and filter response may be detected by sensing the power coupled to the modulator by for example sensing the bias current supplied to the modulator.

Figure 10:
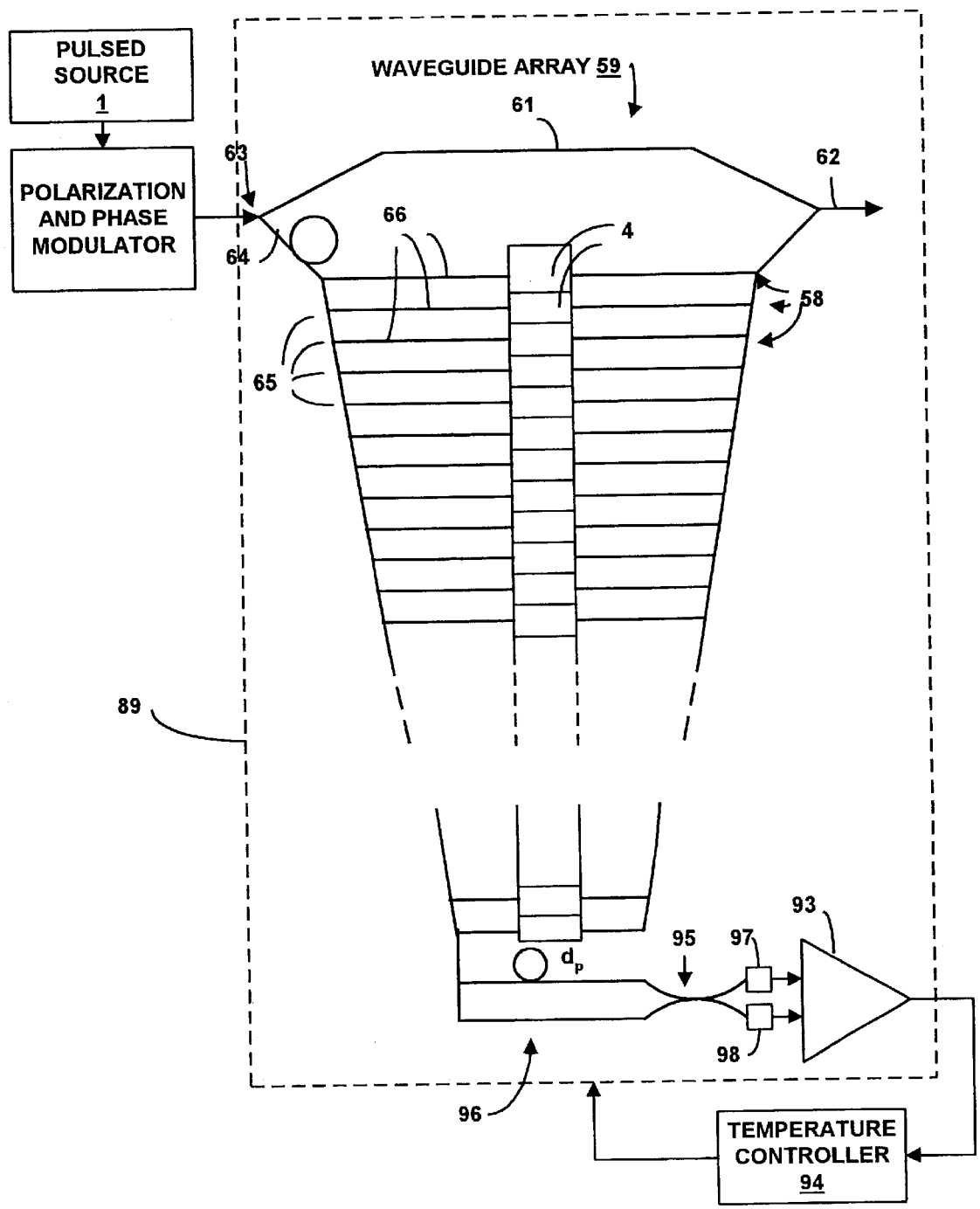
FIG. 10A is a schematic drawing of a Fourier modulator with temperature control.
FIG. 10B is a schematic drawing of a detector of Fourier modulation with temperature control.
Figure 10:
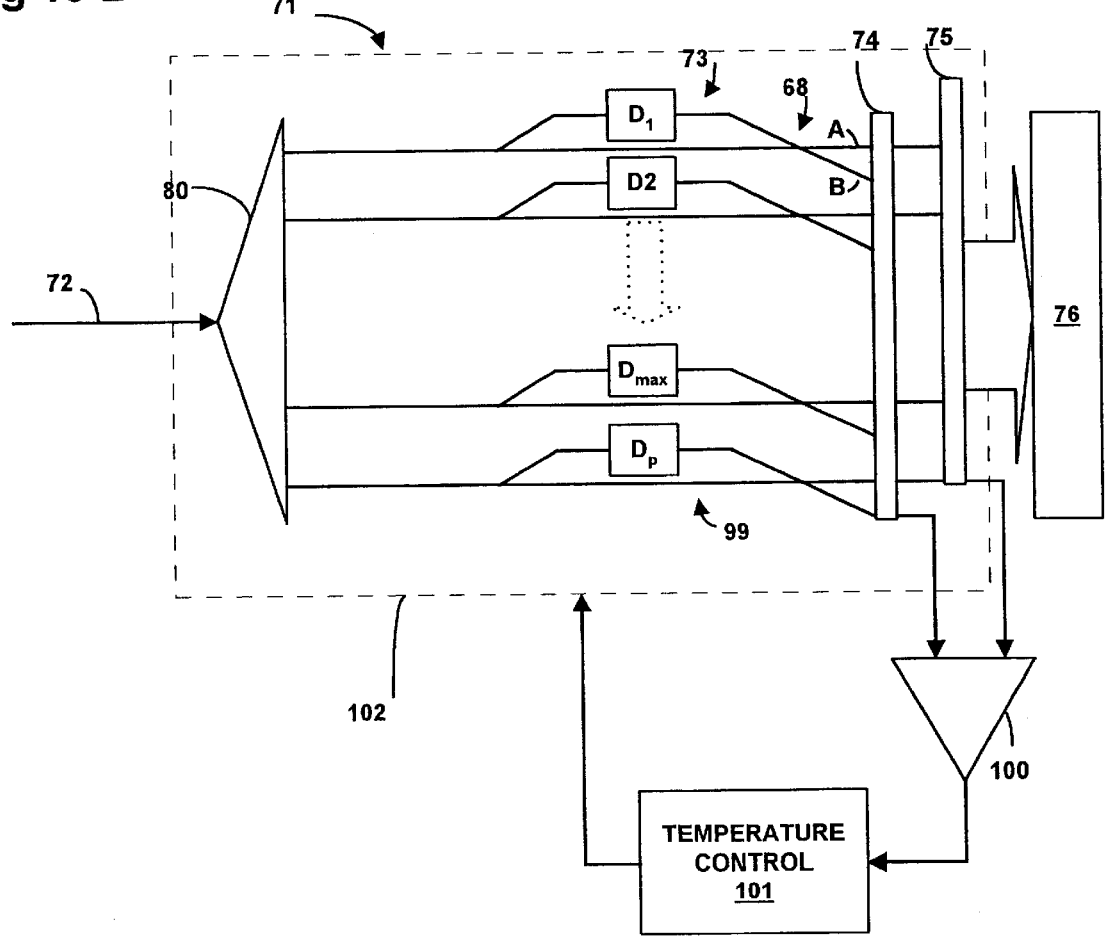

In the embodiment of FIGS. 6 to 9 which utilise Fourier modulation, the effects of drift are accommodated by the use of interleaved delay elements at the receiver responsive to intermediate values of delay $D_i$. A further arrangement is shown in FIG. 10A has an analyser 96 (i.e. a Mach Zehnder filter) of the type shown in FIG. 7 added to the waveguide array 59 of the modulator of FIG. 6A for the purpose of tracking systematic drift in the delay parameter $d_i$. This tracking analyser 96 has a value of delay $d_p$ matched to the pulse repetition rate of the source 1 such that $f_d = d_p^{-1}$. The analyser 90 has a 3 dB coupler 95 at its output, connected to detecting elements 97 and 98 and a differential amplifier 93 detects a difference signal from the outputs of the detecting elements.

The output of the tracking analyser 96 is sensitive to the degree of correspondence between the value of the delay $d_p$ and the inverse of the frequency interval between laser source modes $f_d$. A maximum output is therefore obtained when $d_p = f_d^{-1}$ and any departure from this coincidence follows a sinusoidal characteristic. A temperature control circuit 94 provides regulation of a temperature controlled environment 89 within which the waveguide array 59 is located so as to maintain maximum output of the differential amplifier 93. Since the values of delay are sensitive to temperature, this provides a mechanism for maintaining matching performance of laser source 1 and waveguide array 59.

A similar control mechanism may be utilised at the receiver as shown in FIG. 10B where an additional analyser 99 has a delay $D_p$. Differential outputs from the analyser 99 are amplified by differential amplifier 100 and used in a feedback loop to drive a temperature control 101 which regulates a temperature controlled environment 102 containing the waveguide array 71.

Alternative embodiments are envisaged in which for example the transmission type modulating elements of FIGS. 1 and 5 are replaced by reflection type modulating elements. Similarly, the Dragone wavelength router of FIG. 3 may be configured to utilise a wavelength array grating in which light is conducted to a further star coupler instead of utilising the reflectors provided at the free ends 36.

The embodiment of FIG. 5 using WDM may alternatively utilise alternate laser mode frequencies to provide guard bands between selected modes. Conventional spectral reduction techniques such as partial response coding may also be used. Duobinary coding may for example be employed, using a modulation technique which encodes the signal at three possible levels or states, providing the transmitter with appropriate precoding circuitry for each channel and providing the receiver with appropriate decoding circuitry for each channel.

What is claimed is:

1. A method of optical communication comprising the steps of;

transmitting a train of optical pulses;

multiplexing each pulse to provide a plurality of channels; and applying error correction coding to data carried by the channels using both interchannel coding and serial coding of individual channels.

2. A method as claimed in claim 1 wherein said interchannel coding provides for each pulse a code word consisting of bits carried by the plurality of channels, said bits comprising user data bits and parity bits.

3. A method as claimed in claim 2 wherein said serial coding comprises the formation of code words for respective individual channels, each code word comprising a series of said user data bits from different pulses and from the individual channel and further parity bits applying error correction coding thereto.

4. A method as claimed in claim 3 wherein the serial coding provides code words consisting of user data bits from non-successive optical pulses such that said code words are interleaved.

5. A method as claimed in claim 1 wherein at least one of said interchannel coding and said serial coding comprises a BCH code providing correction of multiple errors per code word.

6. A method as claimed in claim 1 wherein said interchannel coding comprises a Hamming code.

7. An optical communication system comprising;

a transmitter operable to transmit a train of optical pulses;

multiplexing means operable to multiplex each pulse to provide a plurality of channels; and encoding means operable to apply error correction coding to data carried by the channels using both interchannel coding and serial coding of individual channels.

8. A system as claimed in claim 7 wherein said interchannel coding provides for each pulse a code word consisting of bits carried by the plurality of channels, said bits comprising user data bits and parity bits.

9. A system as claimed in claim 8 wherein said serial coding comprises the formation of code words for respective individual channels, each code word comprising a series of said user data bits from different pulses and from the individual channel and further parity bits applying error correction coding thereto.

10. A system as claimed in claim 9 wherein said encoding means comprises interleaving means operable such that the serial coding provides code words consisting of user data bits from non-successive optical pulses whereby said code words are interleaved.

11. A method as claimed in claim 7 wherein at least one of said interchannel coding and said serial coding comprises a BCH code providing correction of multiple errors per code word.

12. A method as claimed in claim 7 wherein said interchannel coding comprises a Hamming code.

* * * * *